US006611644B2

United States Patent
Galstian

(10) Patent No.: US 6,611,644 B2
(45) Date of Patent: Aug. 26, 2003

(54) NON-RECIPROCAL OPTICAL ELEMENT FOR PHOTONIC DEVICES

(75) Inventor: Tigran Galstian, Ste-Foy (CA)

(73) Assignee: Universite Laval, Sainte-Foy (CA)

( * ) Notice: Subject to any disclaimer, the term of this patent is extended or adjusted under 35 U.S.C. 154(b) by 0 days.

(21) Appl. No.: 09/726,536

(22) Filed: Dec. 1, 2000

(65) Prior Publication Data

US 2001/0036011 A1 Nov. 1, 2001

Related U.S. Application Data

(63) Continuation of application No. 09/714,829, filed on Nov. 17, 2000, now abandoned, and a continuation of application No. 09/714,828, filed on Nov. 17, 2000, now abandoned.
(60) Provisional application No. 60/165,928, filed on Nov. 17, 1999, and provisional application No. 60/165,929, filed on Nov. 17, 1999.

(51) Int. Cl.[7] .................................................. G02B 6/34
(52) U.S. Cl. ............................................ 385/37; 385/122
(58) Field of Search .............................. 385/15, 24, 37, 385/122, 1–3, 7

(56) References Cited

U.S. PATENT DOCUMENTS

| 4,736,382 A | 4/1988 | O'Meara |
| 5,267,077 A | 11/1993 | Blonder |
| 5,448,404 A | 9/1995 | Schrenk et al. |
| 5,555,330 A | 9/1996 | Pan et al. |
| 5,559,825 A | 9/1996 | Scalora et al. |
| 5,568,316 A | 10/1996 | Schrenk et al. |
| 5,661,839 A | 8/1997 | Whitehead |
| 5,818,986 A | * 10/1998 | Asawa et al. .................. 385/24 |
| 6,185,023 B1 | * 2/2001 | Mizrahi ....................... 359/130 |
| 6,275,511 B1 | * 8/2001 | Pan et al. ........................ 372/6 |

OTHER PUBLICATIONS

IEEE/OSA Journal of Lightwave Technology on Applications of Photosensitivity and Quadratic Nonlinearity in Glasses, vol. 15, No. 8, (Aug. 97).

P. Günter and J. P. Huignard, eds., Photorefractive Materials and Their Applications I–II, vol. 61–62 (Berlin, Springer, 1989).

* cited by examiner

Primary Examiner—Mark A. Robinson
Assistant Examiner—Alessandro V Amari
(74) Attorney, Agent, or Firm—Kent Daniels; Ogilvy Renault

(57) ABSTRACT

This invention relates to fabrication techniques for the creation of new optical elements, an asymmetric (non-reciprocal) diffraction grating and a passive nonlinear optical (visible, microwave, etc.) isolator (diode). It may have potential applications in the field of optical detection (spectrometers) and communications (circulators, wavelength division multiplexing circuits, etc.), etc. One of applications of this proposal is the significant reduction of the noise level in optical communication systems or any other optical systems using laser sources. Another potential interest of these diodes is the fabrication of integrated laser gyroscopes for applications in aviation, etc.

9 Claims, 15 Drawing Sheets

NON-RECIPROCAL OPTICAL ELEMENT FOR PHOTONIC DEVICES

This Application claims priority of U.S. patent application 60/165,928 and of U.S. patent application Ser. No. 60/165,929, both filed on Nov. 17, 1999. This application is a continuation of U.S. patent application Ser. No. 09/714,829 and of U.S. patent application Ser. No. 09/714,828, both filed on Nov. 17, 2000 and both are now abandoned.

FIELD OF THE INVENTION

This invention relates to fabrication techniques for the creation of new optical elements, an asymmetric or non-reciprocal diffraction grating and a passive nonlinear optical (visible, microwave, etc.) isolator (such as a diode). It may have potential applications in the field of optical detection (spectrometers), lasers and communications (circulators, wavelength division multiplexing circuits, etc.), etc. Another potential interest of these diodes is the fabrication of integrated laser gyroscopes for applications in aviation, etc.

BACKGROUND OF THE INVENTION

Many applications, in particular in spectroscopy, laser technology and optical communications, require asymmetric or non-reciprocal optical elements. The most commonly used devices are optical isolators (for non-reciprocal transmission) and surface blazed diffractive gratings (for non-reciprocal reflection or diffraction). The optical isolators are very expensive, while the fabrication of blazed surface structure becomes more and more difficult (due to the increasing cost) as far as smaller features are required.

Bragg gratings (or reflectors) actually attract important attention in view of applications in Photonics and communication systems, in particularly, as filters in Wavelength Division Multiplexing (WDM) systems. In particular, the special Issue of the IEEE/OSA journal of Lightwave Technology on Applications of Photosensitivity and Quadratic Nonlinearity in Glasses, Vol. 15, No 8, (August 97) discusses such applications. The operation of these filters is based on periodic modulation of the refractive index n of used optical medium (fiber, guide, etc.) at a given wavelength (for example, the wavelength of communication $\lambda_c$). Indeed, the following conditions are required for its operation:

1) in the medium there exists a periodic (with periodicity $\Lambda$) modulation of refractive index $n(\lambda_c)$.
2) the $\lambda_c$ is near or multiple of $2\Lambda$ ($\Lambda \approx m\, \lambda_c/2$, $m=1, 2, 3\ldots$ — the Bragg resonance condition).

Usually, during fabrication, only the $n(\lambda_c)$ of the medium is modulated periodically, while its absorption $\alpha(\lambda_c)$ is relatively small and spatially uniform. Any possible (residual, etc.) modulation of $\alpha(\lambda_c)$ in these cases is synchronized with the modulation of $n(\lambda_c)$, that is, their relative spatial shift $\Delta=0$ (see FIG. 1). Such "traditional" Bragg filters have been shown to be excellent reflectors with very promising applications. However, in these elements, two counter propagating directions (+z and −z) are equivalent (reciprocal) and have the same diffractive characteristics. As can be seen in FIG. 1, the medium 20 spans from z=0 (30) to z=L (32). The period 24 is calculated between two maximum peaks and the relative spatial shift $\Delta 22$, between a maximum peak of the refractive index curve 26 and a maximum peak of the absorption curve 28.

Non centro-symmetric photorefractive crystals have a non-reciprocal character as is discussed in P. Günter and J. P. Huignard, eds., Photorefractive Materials and Their Applications I–II, Vol. 61–62 (Berlin, Springer, 1989). That is, one can obtain non symmetrical energy exchange of counter propagating light beams, depending upon the orientation of the optical axis of the crystal (e.g., BaTiO3).

However, photorefractive materials are very costly, the formation of the shifted gratings (of n and $\alpha$) is slow and this effect is difficult to control in general, being a nonlinear phenomenon. That is why, there is no one practical application using photorefractive crystals.

The commonly used technique to fabricate an OI is the use of the following three elements in combination:
1) two polarizers (mutually oriented at 45 degrees),
2) a material possessing significant Faraday effect (constant of Verdet),
3) a source of relatively strong magnetic field.

Other devices have asymmetric reflection of signals (see FIGS. 3c and 3d). These are called diffractive elements. Most photons sent to the interface are either reflected or absorbed by the surface.

U.S. Pat. No. 5,559,825 to Scalora et al. discloses a new optical diode that permits unidirectional transmission of light. It comprises alternating layers of a low index material and a high index material.

U.S. Pat. No. 4,736,382 to O'Meara discloses an acousto-optical laser isolator for isolating unwanted, backwardly propagating laser beams. The isolator includes a first acousto-optical transducer Bragg cell to shift the frequency of a forwardly propagating beam by a first step, a second acousto-optical transducer Bragg cell to shift the frequency by a second opposite step and a filter between the two cells. The frequency shifting is effected by introducing phonon energy and requires the use of active devices.

SUMMARY OF THE INVENTION

Accordingly, a first object of the present invention is to provide several new techniques for easy and inexpensive fabrication of a new kind of non-reciprocal reflective/diffractive element.

Accordingly, another object of the present invention is a significant reduction of the noise level in optical communication systems (circulators, wavelength division multiplexing/WDM circuits, etc.), or any other optical systems using laser sources.

Another object of the present invention is to allow the direct fabrication of the discussed element in commercially available fibers, waveguides and other (including integrated) photonic circuits.

According to a first aspect of the present invention, there is provided a non-reciprocal optical element comprising:
an input port;
an output port;
a medium, optically coupled between said ports having two Bragg gratings recorded therein, said gratings being spaced apart, having a same period and each introducing different phase delays in photons reflected therefrom and being arranged so as to cause substantially reflection in light of a predetermined wavelength traveling from said input port to said output port and substantially absence of transmission in said light traveling from said input port to said output port.

Preferably, one of said gratings comprises changes in an absorption or gain of said medium and another of said gratings comprises changes in a refractive index in said medium.

According to a second aspect of the present invention, there is provided a non-reciprocal optical element comprising:

an input port;
a first frequency self-shifting optical element in optical communication with said input port;
an output port;
a second frequency self-shifting optical element in optical communication with said output port, said first and said second frequency shifting optical elements shifting a frequency of light in opposite directions and substantially by a same amount;
a filtering (e.g. Bragg grating) optical element in optical communication between said first and said second frequency self-shifting optical elements, wherein light of a predetermined wavelength traveling from said input port to said output port is shifted in frequency so as not to be reflected by said filtering optical element (e.g. Bragg grating), and said light traveling from said output port to said input port is shifted in frequency so as to be reflected or absorbed by said filtering optical element (e.g. Bragg grating).

Preferably, said first and said second frequency self-shifting optical elements comprise nonlinear and/or strongly dispersive materials.

BRIEF DESCRIPTION OF THE DRAWINGS

These and other features, aspects and advantages of the present invention will become better understood with regard to the following description and accompanying drawings, in which.

For the purpose of the present invention, the following term is defined below. The term "absorption" is intended to include the use of "lasing" or active ions (for example, the Erbium) which will allow to realize elements with amplification gratings.

DETAILED DESCRIPTION OF THE PREFERRED EMBODIMENT

Three principal techniques are proposed as solutions: the mask technique, the deposition (or growth) technique, and the holographic technique.

Alternating Matter (Dispersion and Absorption Management)

Figure 4:
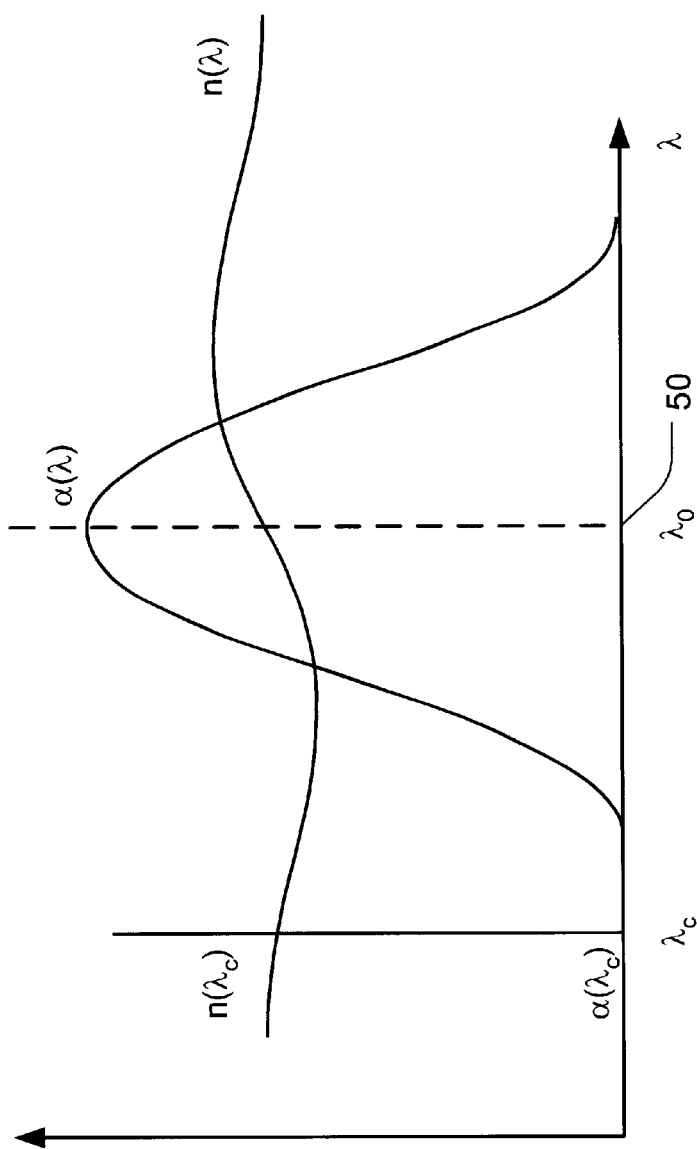
FIG. 4 is an illustration of the absorption spectrum and the corresponding dispersion for an ion.
Figure 5:
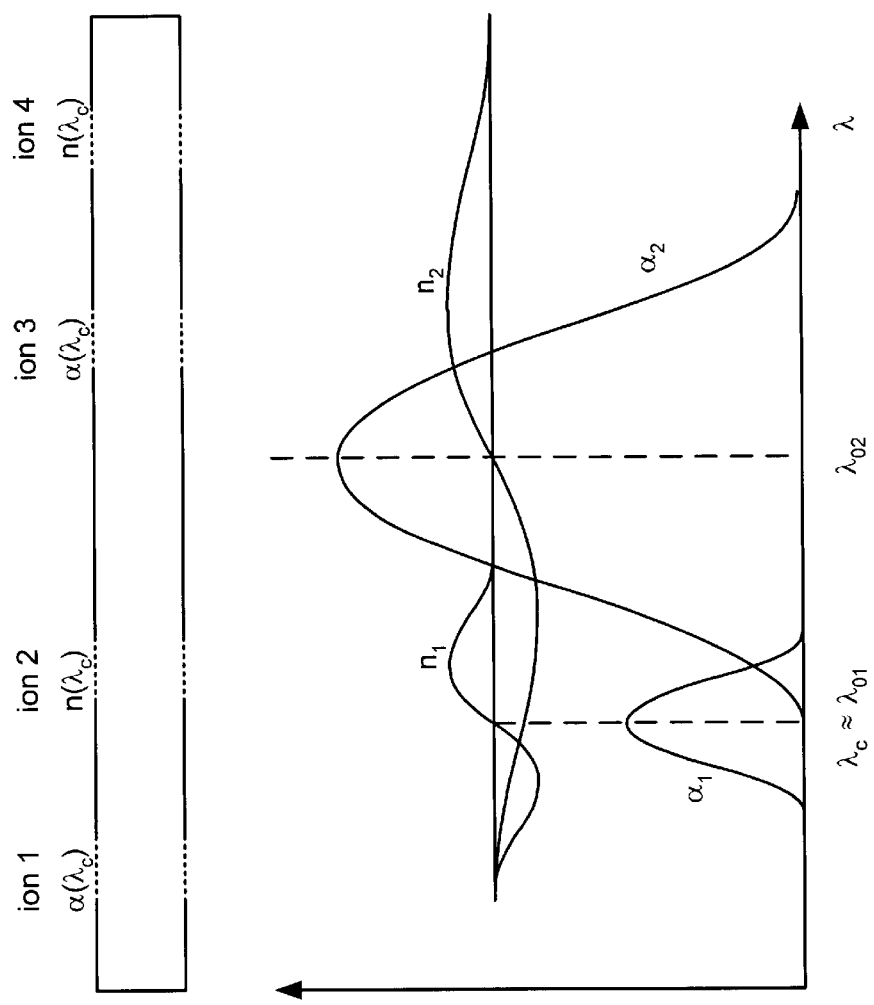
FIG. 5 is an illustration of the absorption spectrums and the corresponding dispersions for two ions.

It is known that different "particles" (atoms, molecules, defects, color centers and ions) have particular absorption spectrums $\alpha(\lambda)$ and corresponding dispersion $n(\lambda)$. FIG. 4 schematically shows such a situation, where $\lambda_0$ 50 is the resonance wavelength of, e.g., an ion absorption. Referring now to FIG. 5, if we introduce or create (in a given position $r_0$ of a matrix, e.g., a glass) a properly chosen ion (say, ion 1), then we can easily control the values of $\alpha_1(\lambda_c)$ and $n_1(\lambda_c)$ at the "working wavelength" $\lambda_c$, but at the position $r_0$ only. We can then introduce or create a second ion (ion 2) at the position $r=r_0+\Delta$, that will create different (from the ion 1) modulations of $\alpha_2(\lambda_c)$ and $n_2(\lambda_c)$ at the same wavelength $\lambda_c$, but at position r only.

If the spectral positions of central absorptions ($\lambda_{01;02}$) for the ion 1 ($\lambda_{01}$) and ion 2 ($\lambda_{02}$) are correctly chosen (with respect to $\lambda_c$), then the $\alpha_1(\lambda_c)$ may be important, say, at the spatial position $r_0$ (implanted by the ion 1), while the $n_2(\lambda_c)$ would be important at the position r (implanted by the ion 2), see FIG. 3. In the example of FIG. 5, we can see, that the ion 2 creates significant refractive index change (shown here is a reduction of the refractive index, but it can be also an increase) with respect to the non implanted refractive index (represented by the thin horizontal line) at $\lambda_c$ due to the distance $\lambda_c-\lambda_{02}\neq 0$. At the same time, the ion 1 (implanted in the neighbor area) creates mainly absorption at the $\lambda_c$, but its influence on the $n(\lambda_c)$ is small since $\lambda_c-\lambda_{01}=0$. We can thus easily obtain modulations of $n(\lambda_c)$ and $\alpha(\lambda_c)$, shifted on the desired $\Delta$.

If we want to use this element for the infrared (IR) communication systems (e.g., at $\lambda_c=1.55$ $\mu$m), then the ion 1 could be, for example, Erbium, since it has resonant bands near to communication wavelengths ($\lambda_{01}=1.54$ $\mu$m) and thus, it may be pumped (e.g., by a diode source) to give amplification, instead of absorption. Other materials such as Praseodymium, Neodymium, etc. could be used depending upon the desired $\lambda_c$.

Implantation and Lithographic Techniques (or Mask Technique)

Figure 1:
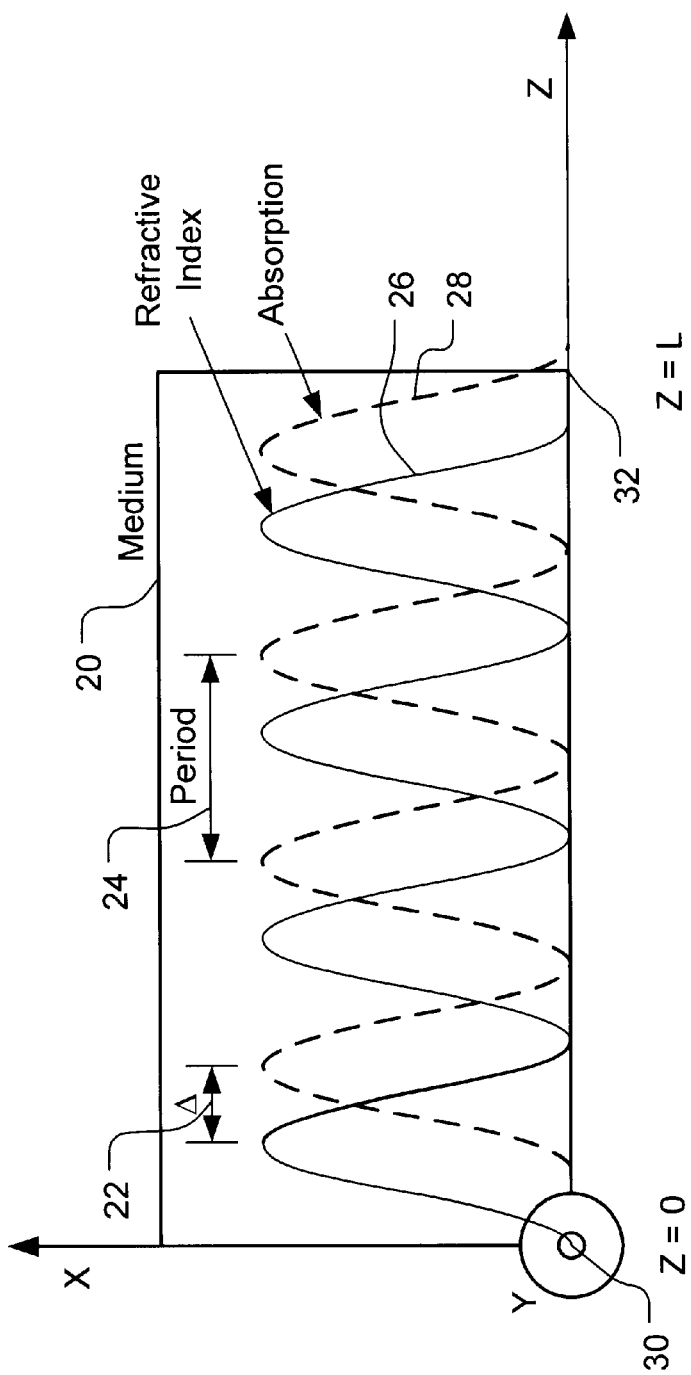
FIG. 1 is an illustration of the characteristics of a traditional Bragg Filter.
Figure 2:
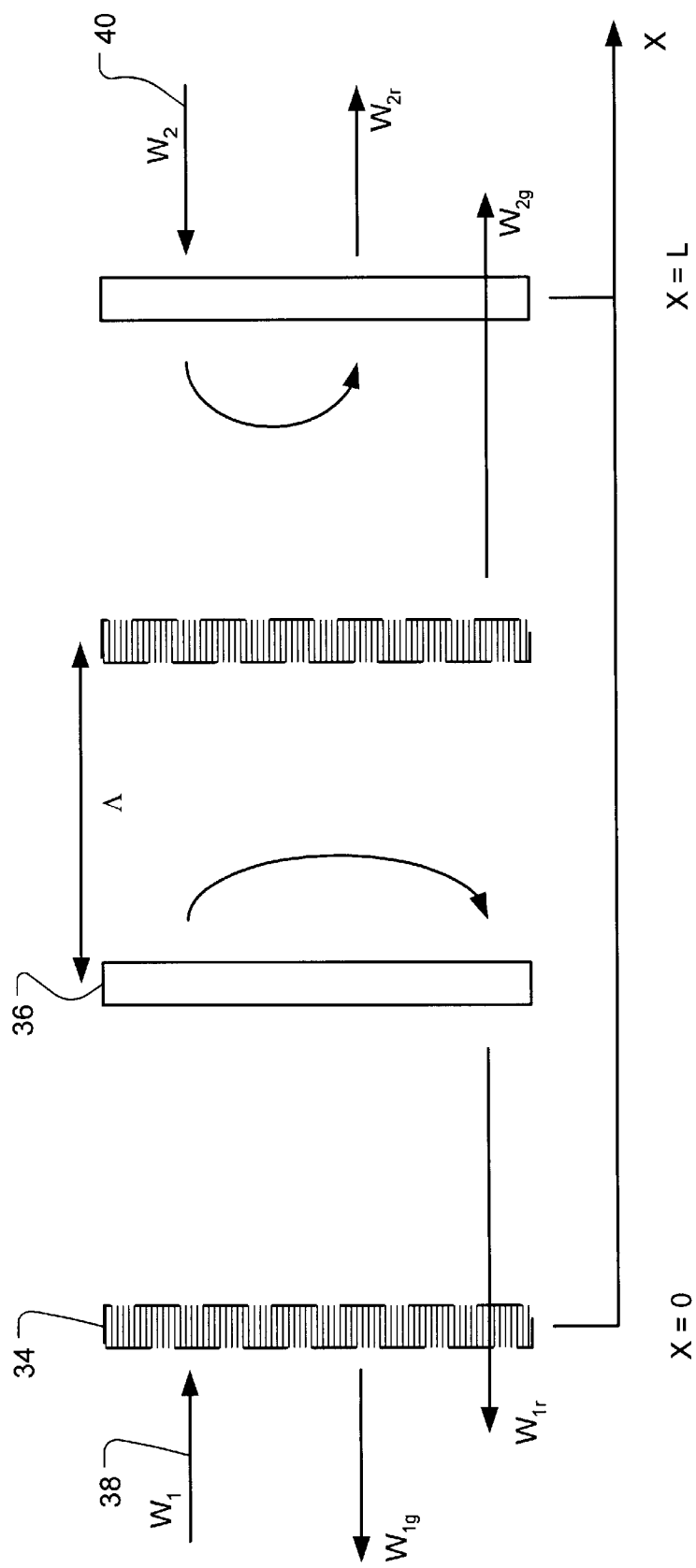
FIG. 2 is an illustration of the difference in phase of the reflected beam.
Figure 3A:
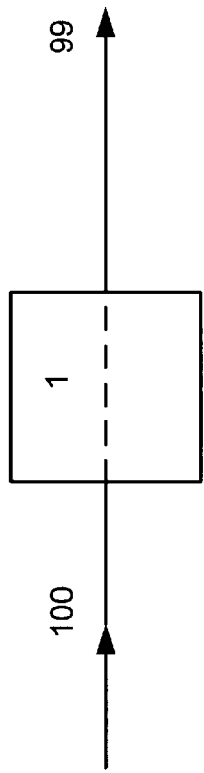
FIG. 3 is an illustration of the behavior of the beams when faced with an optical isolator and an asymmetric diffractive element.
Figure 3B:
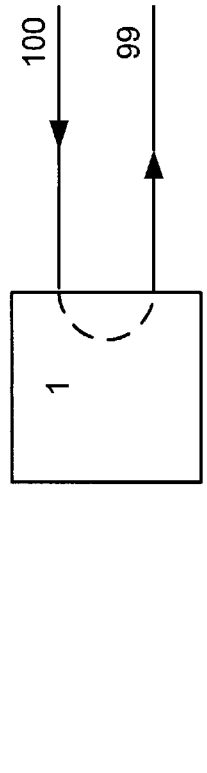
Figure 3C:
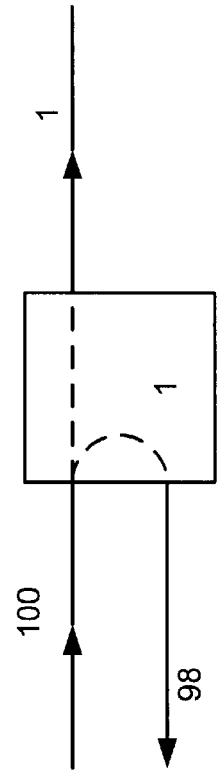
Figure 3D:
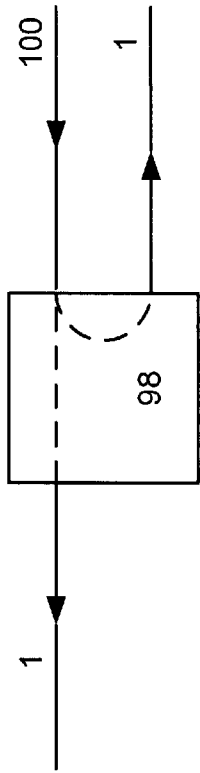

It is known that different interfaces may change differently the phase of the reflected beam. Let us assume that the dotted plane 34 (see FIG. 2) represents the interface where there is no phase shift during reflection, $\Delta\Phi_g=0$ (typical case for refractive index modulation gratings). Let us also assume that we have another interface 36 (active, or absorption modulation grating) where there is a certain, non zero, phase delay during reflection, $\Delta\phi_r=-\delta_0$ (the full plane in FIG. 2—typical case of amplification gratings). Let's now consider two cases:

Going towards the "+x": If the incident beam ($w_1$ 38 in FIG. 2) "sees" the dotted plane before the full one, then the photons reflected from the full plane will be in a "large" phase delay (with respect to photons reflected from the dotted plane) due to:

A. the "go & back" of "full" photons ($2\Lambda K$, where K is the wave vector and $\Lambda$ is the period of the grating) and B. the reflection delay of "full" photons ($\delta_0$).

Thus the total phase difference (at x=0) between photons reflected from the dotted and full planes will be the sum of A&B: $\Delta\Phi_{x=0}=\Delta\Phi_g-\Delta\Phi_r=2\Lambda K+\delta_0$.

Going towards the "−x": If the incident beam ($w_2$ 40 in FIG. 2) "sees" the dotted plane after the full one, then the photons reflected from the full plane will be in the "less" phase delay (with respect to photons reflected from the dotted plane) because the phase delay of "full" photons during reflection will in part compensate the phase delay of "dotted" photons due to their "go & back" ($2\Lambda K$). Thus, the phase difference (at x=L) in this case will be $\Delta\Phi_{x=L}=\Delta\Phi_g=\Delta\Phi_r=2\Lambda K-\delta 0$. This is a non reciprocal reflection.

Devices transmitting signals in only one direction (see FIGS. 3a and 3b) are called optical isolators (OI). The OI could be compared with diodes in electronic systems and its role is extremely important in modern photonic technologies. This is related, for example, to the problem of noises and instabilities in optical systems, crated by back reflections of signals. That makes strategically important the use of OI, for example, in optical and microwave communication systems.

Using a beam B of a properly chosen ion (for example, an atom, molecule or ion), one can spatially change (control) the values of $\alpha_I(\lambda_c)$ and $n_I(\lambda_c)$, via the implantation of the ion by the use of a periodic mask M. In principle, we thus obtain a (spatially) periodic modulation of n and α, but their relative shift is fixed ($\Delta=0$). This is not the desired relative shift. This is why, after the first implantation, the mask (or the medium) is shifted on the desired distance Δ and the implantation is continued by a second ion, that crates additional (different from the first ion) modulations of $\alpha_2(\lambda_c)$ and $n_2(\lambda_c)$ at the same wavelength $\lambda_c$.

Other implantation techniques also (for example, natural, photo-assisted or other kinds of diffusion) may be used in the framework of the same approach (in combination with a mask, an interference pattern, etc.). Light sources may also be used for the same purposes. In this case, two types of ions (or photosensitive centers) may be introduced initially in the matrix. The first exposition (with a wavelength 1) would create the desired centers of the first type and the second exposition (with another wavelength 2, after the spatial shift of the mask, the interference pattern or the medium) would create centers of the second type. Another possibility is to use combination of implantation and further UV illumination to create the same shifted modulation picture since the ion implantation may induce new (desired) absorption lines in the UV band. Obviously, the implantation will not be required if the material contains already the desired 2 components (or materials that may be transformed into these components).

Consecutive Deposition or Growth Technique

Figure 6:
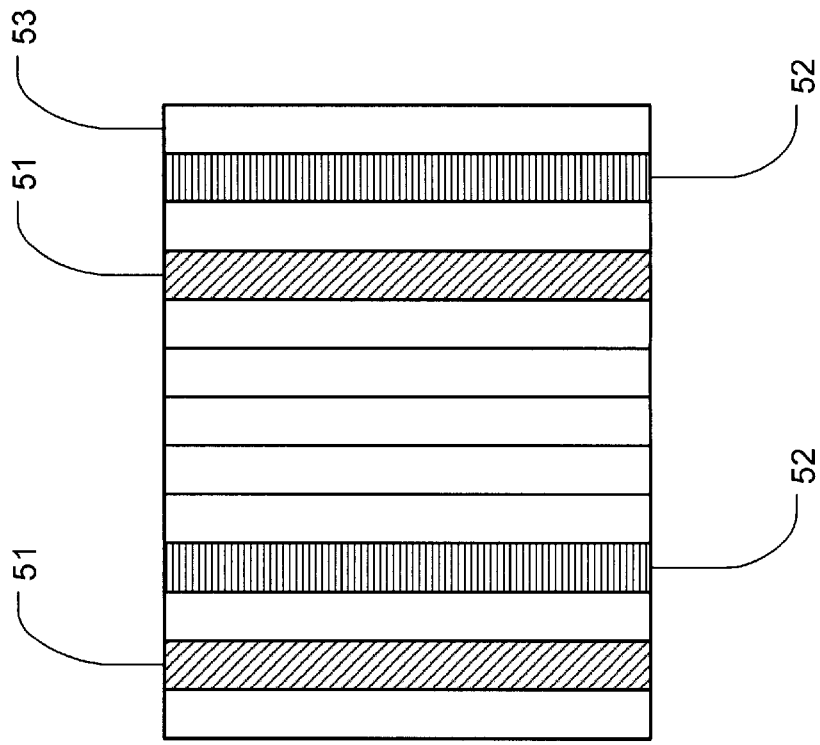
FIG. 6 is an illustration of the consecutive deposition or growth technique.

Non reciprocal elements may be created also for applications in non-guiding (bulk) geometries (see FIG. 6). Thus, other (e.g., vacuum deposition, quantum wall fabrication, etc.) techniques may be used to create consecutive layers with different refractive index and absorption values. To do so, we need once again two ions (51 and 52) and an optically transparent material, such as a matrix 53. If this is done using, for example, a vacuum deposition, then we should simply provide one of ions (say the ion 51) during a certain deposition time $t_1$, then we provide the material 53 during the time $t_3$, then the material 52 during the time $t_2$. For a fixed deposition rate, the times $t_1$, $t_2$ and $t_3$ will be adjusted to obtain the required relative positions of refractive index and absorption (amplification) gratings.

Holographic Technique (Via Phase Shift, etc.)

Figure 7A:
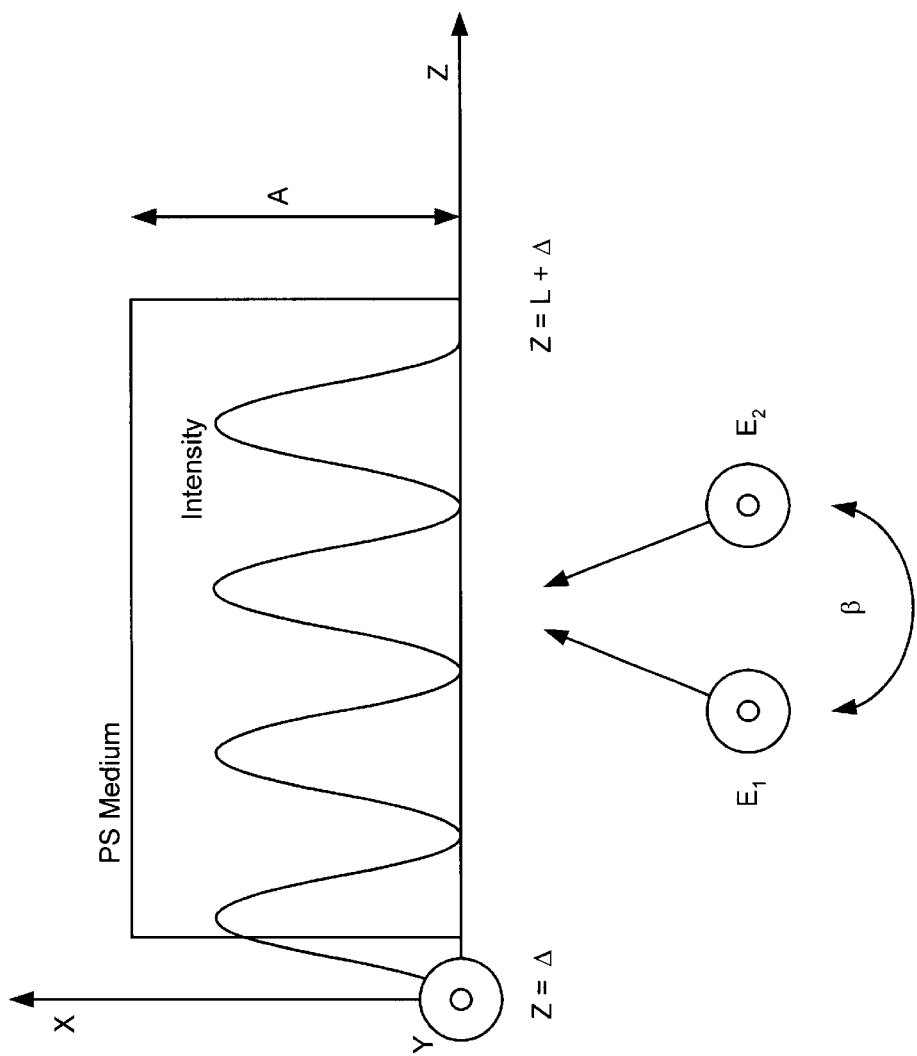
FIG. 7a and FIG. 7b are illustrations of the holographic technique.
Figure 7B:
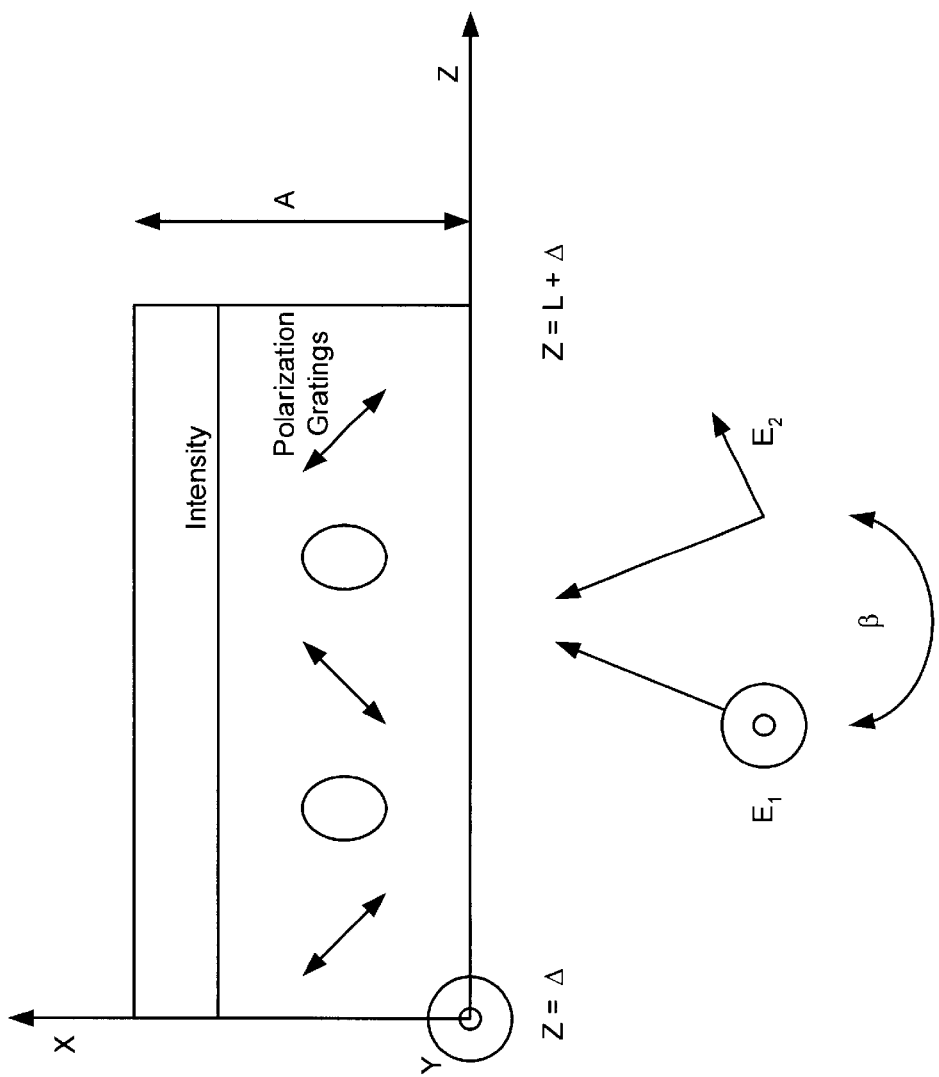

It is known that mechanisms of modulation of refractive index and absorption in optical materials may be sensitive to the intensity of light (of type: gamma, ultraviolet, visible or infrared) and also to the polarization of light (e.g., via the Weigert effect, see Sh. D. Kakishashvili, Opt. & Spectrosc., V.33, (1972) 171.). Thus, one can use the intensity-dependent mechanism (isotropic molecular bleaching, permanent photo transformation, photo polymerization, etc.) to modulate, for example, the absorption $\alpha(\lambda_c)$ of the medium (containing appropriate centers), spatially modulating the light intensity (by means of a simple holographic exposition, when polarizations of two interfering beams $E_1$ and $E_2$ are parallel, see FIG. 7a). The exposition is then stopped and the optical medium is shifted at desired distance Δ. Then the polarization of one of interfering beams is rotated at 90 degrees, and thus, the interference pattern disappears (the intensity is spatially uniform), see FIG. 7b. In this case, the polarization of resulting beam is spatially modulated with the same period (if the crossing angle β of two beams is conserved). Thus, we can use the polarization-sensitive mechanism (angular hole burning, molecular reorientations, etc., for instance, in Azo dye containing systems) to modulate the $n(\lambda_c)$ of the medium. We will obtain thus the same situation (with shifted gratings) as in the implantation case, described above.

Figure 8:
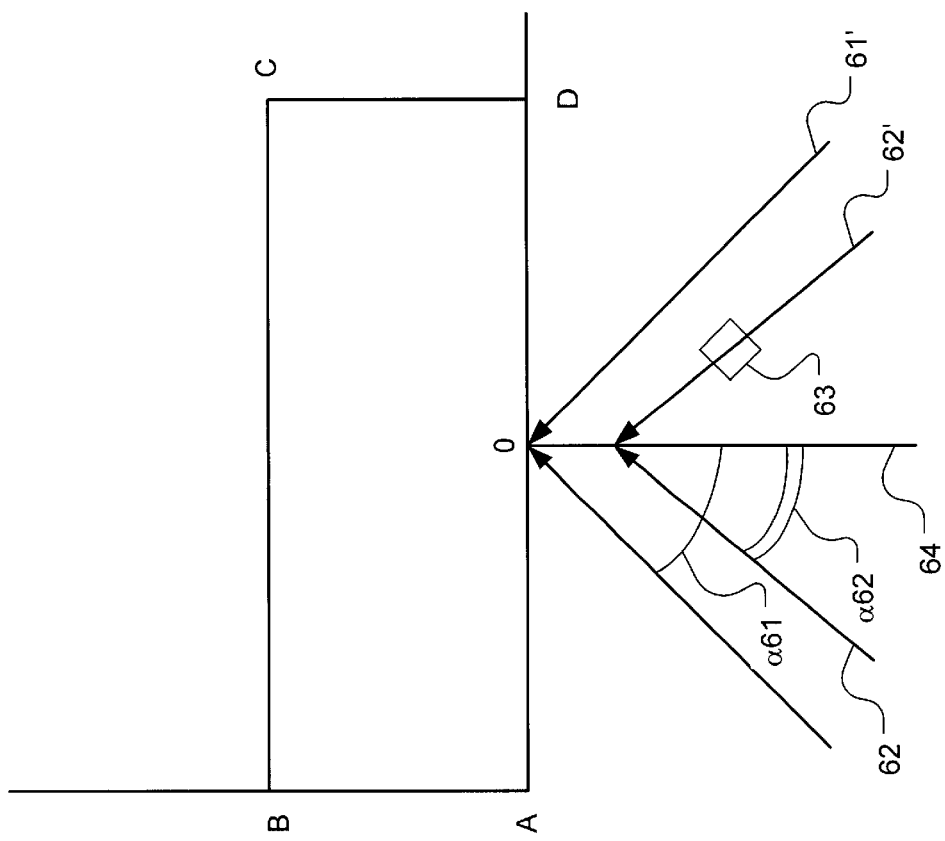
FIG. 8 is an illustration of an experimental set-up for the holographic technique without the use of polarization sensitive dyes.

The same technique may be used also without polarization sensitive dyes. In this case, two exposition wavelengths are consecutively used to "bleach" two spectrally different dyes. The corresponding experimental set-up is depicted in FIG. 8. The principal elements of this figure are:

ABCD, the photosensitive plate (or waveguide, fiber, etc.) doped by two dyes (1 and 2);

61 and 61', the recording beams with wavelength 1 (absorbed by the dye 1) and with cross section angle a 61;

62 and 62'—recording beams with wavelength 2 (absorbed by the dye 2) and cross section a 62;

63, the phase modulator,

64, the normal to the photosensitive plate.

Finally, the condition to be satisfied is $$\Lambda = \frac{1_1}{2n(1_1)\sin(a_{61}/2)} = \frac{1_2}{2n(1_2)\sin(a_{62}/2)}.$$

The main difference with the above described mask technique is that the exposition gratings are perfectly sinusoidal, with the same period (via the choice of the angles a 61 and a 62). The phase modulator allows the controlled phase shift between recording beams to provide the desired spatial shift of interference fringes and resulting gratings.

Holographic Single Exposition

Figure 9:
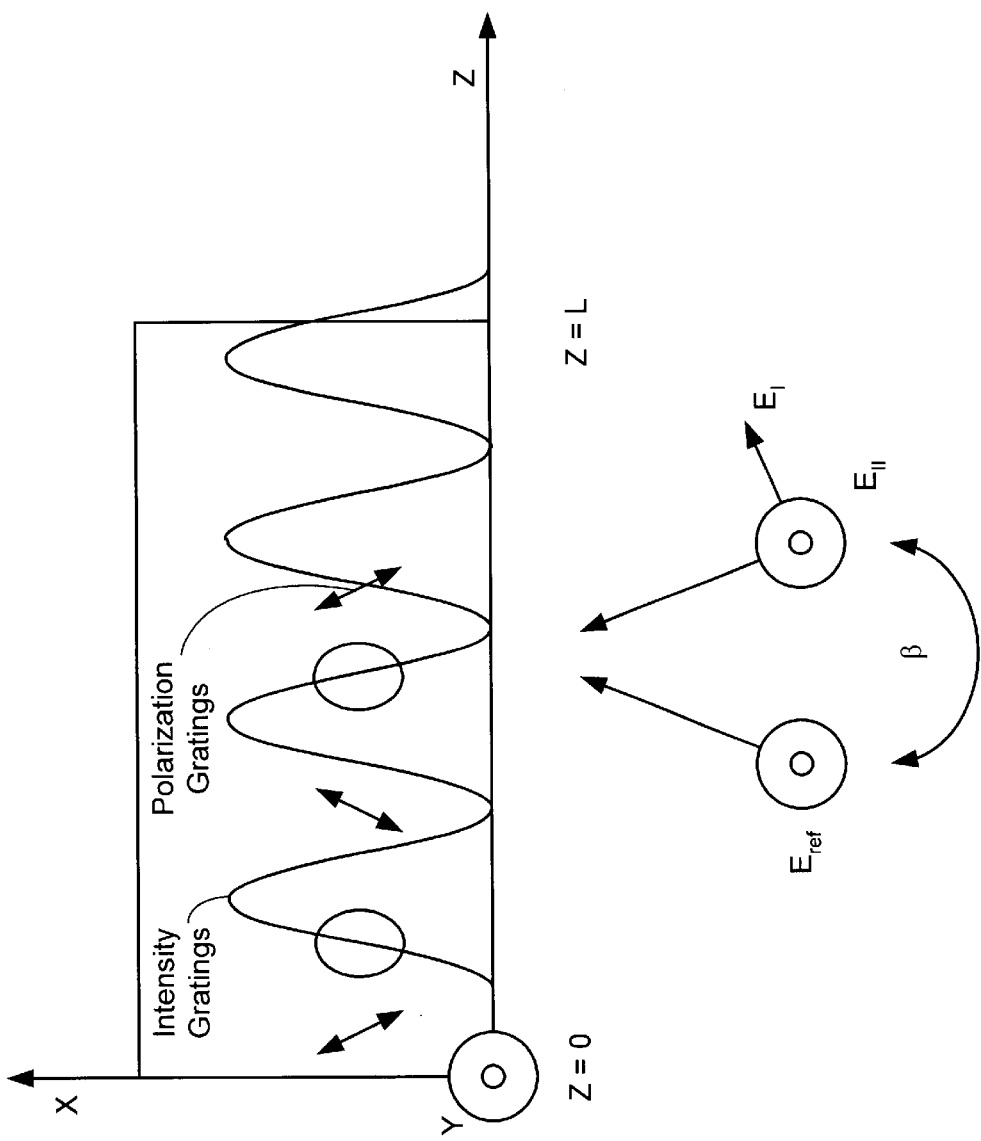
FIG. 9 is an illustration of the holographic single exposition method.

Referring now to FIG. 9, another (holographic) technique could be used for single exposition fabrication of shifted refractive index and absorption (amplification) gratings. If one of the writing beams has elliptical polarization, then each of its polarization component (parallel $E_{II}$ and perpendicular $E_\perp$ to the fixed linear polarization of the reference beam $E_{\cdot ref}$) can record a separate grating with the reference beam $E_{\cdot ref}$. The parallel component will write an "intensity" hologram (intensity gratings, see FIG. 7a) and the perpendicular component will write a "polarization" hologram (polarization gratings, see FIG. 7b). These gratings will be recorded simultaneously, but with a π/2 phase shift, since the $E_{II}$ and $E_\perp$ components of the circularly polarized beam are phase shifted on π/2. The last two techniques (using such combined gratings) will, in addition, have very useful polarization properties.

The necessary conditions required for such medium to be non reciprocal are the following conditions:

1) in the medium, there exist periodic (with periodicity Λ) modulations of both refractive index $n(\lambda_c)$ and absorption $a(\lambda_c)$ or amplification.
2) the $\lambda_c$ is near to 2Λ (as is the case in Bragg filters).
3) modulations of $n(\lambda_c)$ and $\alpha(\lambda_c)$ are spatially shifted one with respect to other on a certain value Δ (the optimal shift for the best non-reciprocity is π/2).

Note that almost the same conditions (the modulation of n and the resonance condition, but not the shift) are necessary also for traditional (widely used) Bragg filters.

Non-reciprocal Transmission Element (DIODE)

As pointed out, the main application of optical isolators is based on the effect of non-reciprocal transmission.

The basic feature of this preferred embodiment of the present invention is the nonlinear frequency shift and spectrally selective transmission. The system uses two nonlinear and/or dispersive media and a spectral filter, e.g. gas cell or Bragg spectral filter (BSF), placed between them. The nonlinear media provide the light nonlinear frequency self-shift (or chirp). The brief description of its operation follows.

Figure 10:
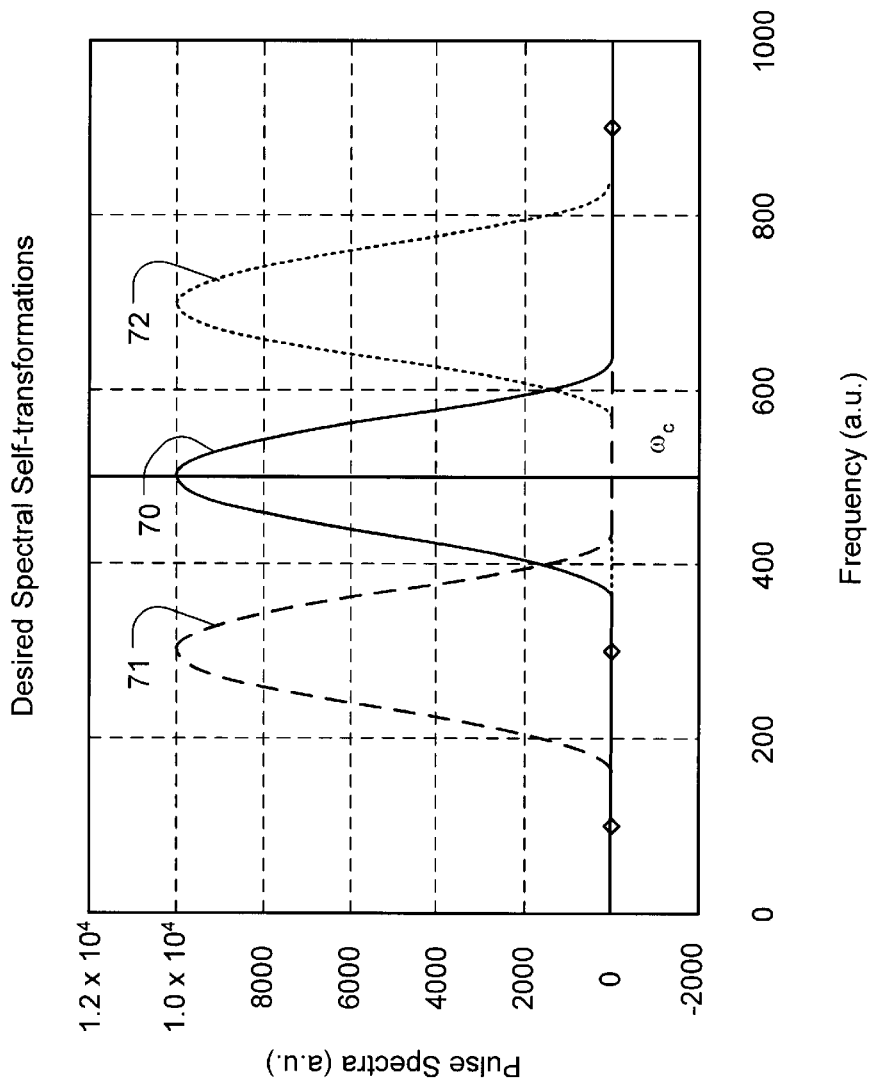
FIG. 10 is an illustration of the frequency spectrum of the signal inside of the non-reciprocal transmission element.

Any signal (e.g., optic or electric) may be represented by a corresponding frequency spectrum, for example centered on $w_c$, as in FIG. 10 (curve 70). This frequency spectrum may be shifted by the optical signal itself, if it propagates through an appropriate nonlinear and/or dispersive medium. At the same time, the transmission of optical signals via optical systems (fiber, waveguide, etc.) may be easily modulated using a BSF or any spectral filter (e.g. gas cell, etc.). Let's suppose that we have two different nonlinear media and a BSF or any spectral filter (e.g. gas cell, etc.) placed between them. Let's suppose also that the choice of these nonlinear media is made in a manner that we have a spectral up-shift when the light propagates in the first nonlinear media, but the frequency is down-shifted when the light propagates in the second media. Thus, the same signal pulse will have different spectra when approaching to the BSF or any spectral filter (e.g. gas cell, etc.), depending upon the direction of propagation. If the characteristics of the media and of the BSF or any spectral filter (e.g. gas cell, etc.) are properly chosen (taking into account the signal characteristics), then the shifted spectra of signal may match with the resonant reflection conditions of the BSF or any spectral filter (e.g. gas cell, etc.) for one of propagation directions. Thus the light with resonant wavelength will be reflected, while the contra propagating light will be transmitted through the BSF or any spectral filter (e.g. gas cell, etc.). The last one will suffer a second (but opposed) frequency shift after propagating through the second media and will almost recover the initial spectral characteristics at the output of the device. We obtain thus a passive (externally non-driven) optical system, which has different transmission coefficient for the same signal, depending upon the direction of its propagation. The system may be even simpler (removing the second media) if the spectral characteristics of the transmitted signal are no important.

Figure 11:
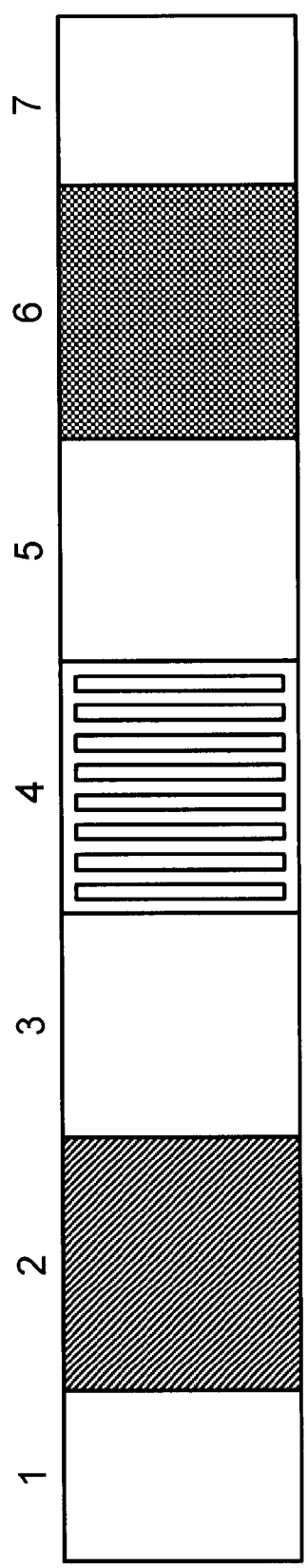
FIG. 11 is an illustration of a transmission element with 7 areas.

A particular but not restrictive case of realization of the described device follows. Let us assume that we have a transmission element (guiding or volume), composed by different areas, from 1 to 7 (see FIG. 11). A possible way of fabrication of such a device would be the recording of a Bragg grating (area 4) in a transparent and linear element (areas 1, 3, 5 and 7). Note that in the general case, these areas are not necessary. They are presented here just as a support matrix of the device, but it may be constructed also from separate pieces (in air). The Bragg grating may be designed, fabricated and tuned (the central frequency of reflection, the spectral dependence, etc.) using techniques which are very well mastered in the prior art (via mask exposition, holography, grating apodization, etc.). However, a linear Bragg grating alone will be a reciprocal and not useful (for diode operation) device. The addition of nonlinear elements will break down the symmetry. Namely, the light transmission from 1 to 7 areas will be the same as the transmission from 7 to 1, if the areas 2 and 6 are absent. The role of these areas is the induction of opposed spectral self-shifts of light. They can be obtained by doping, implantation, irradiation of a linear matrix or simply via consecutive connections of different matrices, etc. The spectral shifts are induced via a nonlinear phase shift of the transmitted light due to the refractive index dynamic modulation and phase-self modulation caused by this light itself (the cross modulation by another pulse may also be used).

Two particular cases must be distinguished here. We can obtain symmetric frequency shifts (simultaneous appearance of both spectral components 71 and 72, FIG. 10) for a temporally symmetric optical pulse in a particular case, when the modifications of n follow instantly the modifications of light intensity. It may be described in the following manner:

In a medium with local instantaneous nonlinear response $$n(I(t))=n_0+\Delta n=n_0+n_2 I(t)+\ldots$$

where $n_0$ is the non perturbed refractive index, I(t) is the light intensity and $n_2$ is the coefficient of proportionality. The obtained frequency shift may be described as $$w_{\mathit{eff}} \approx \partial j/\partial t = w_0 + \partial \Delta j/\partial t, \text{ where } \Delta j(t) = L\frac{w_0}{c}\Delta n(t),$$

L is the length of the medium and $w_0$ is the non perturbed central frequency of the signal. Thus we may estimate $$|\Delta w|_{\max} \approx |\partial \Delta j/\partial t|_{\max} = L\frac{w_0}{c}|\partial \Delta n/\partial t|_{\max}.$$

max. Note that other nonlinearities and different order dispersion (e.g. the III order) phenomena may be used also to obtain the asymmetric frequency shift.

Figure 12:
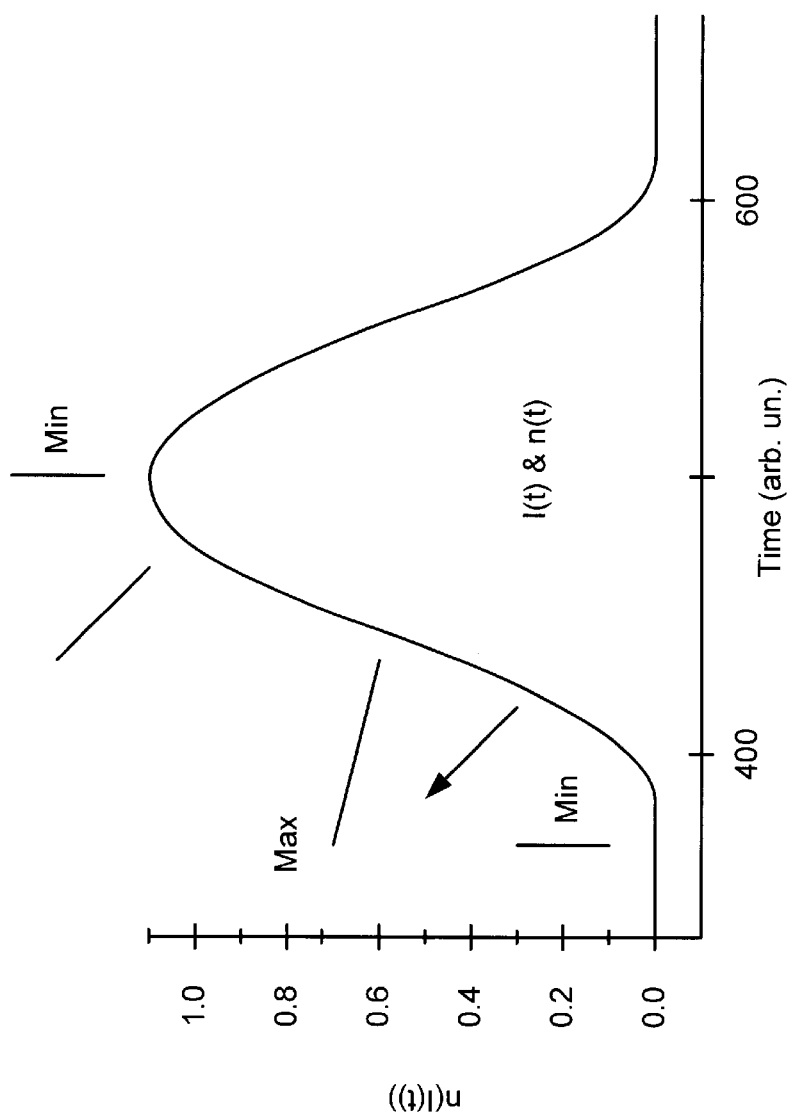
FIG. 12 is an illustration of a laser pulse with gaussian temporal form.

This shift is schematically described on the example of a laser pulse with Gaussian temporal form (see FIG. 10 and FIG. 12). The temporal profiles of the pulse intensity I(t) and refractive index n(t) are the same (see FIG. 12). The frequency shift value is minimal at the wings of the pulse and at the central part (vertical lines). The tilt of these lines represent the gradient of the changes. In addition, the change of the sign of the tilt means a corresponding change of the sign of the ÑDn/Ñ and of the frequency shift direction. Thus, we obtain, in this particular case, a symmetric (up and down) frequency shift. At each side of the spectral shift, there are two places with the same derivative, that is, with the same frequency shift. These components (the same effective frequency) may interfere giving certain spectral oscillations (constructive or destructive interference) if the phase shift is much more then p. This case (instantly response) will be useless (for the optical diode) and we have to use different (e.g. the III order) dispersion to obtain an asymmetric frequency.

Figure 13:
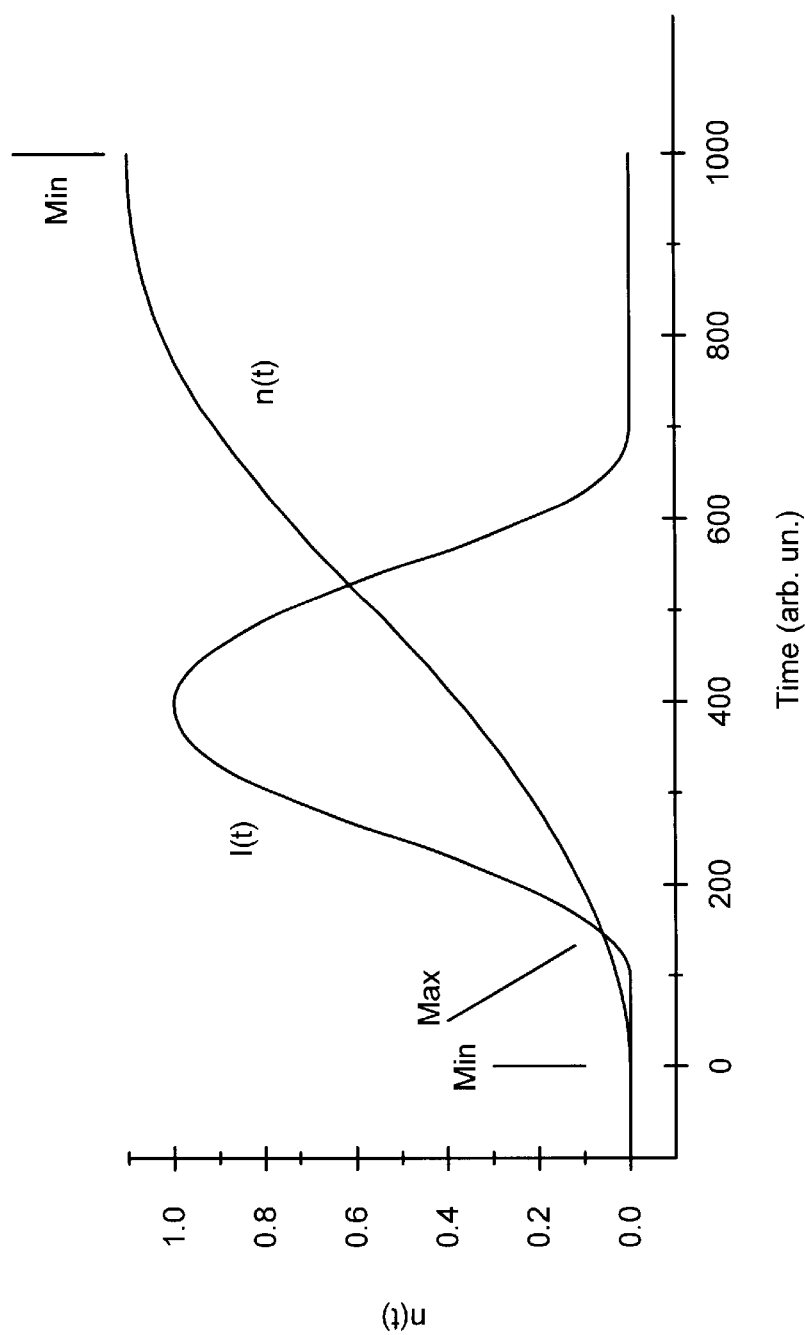
FIG. 13 is an illustration of the case where the response time of the medium is comparable or longer than the light pulse duration.

Another, more interesting case takes place when the response time of the medium (in areas 2 and 6, FIG. 11) is comparable or longer than the light pulse duration. Thus, in such medium (with inertial response) we obtain $$n(I(t), t) = n_0 + n_{eff} \int_{-E}^{t} I(t)\Psi(t-t)dt,$$

where $n_{eff}$ is the coefficient of proportionality, t is the response time of the medium, and Y is a function describing the inertial response of the medium (see FIG. 13). Using the same reasoning as above, we can see, that in this case, we can obtain only (or mainly) one shifted spectral component when there is no sign change of the $\tilde{N}Dn/\tilde{N}$ (the gradient lines do not change the tilt sign). Thus, the frequency shift will be asymmetric (see FIGS. 13 and 14), the direction of the shift depending upon the sign of $n_{eff}$. Thus, the sign of $\Delta$ w may be controlled by the proper choice of the material (in areas 2 and 6). Some simple estimations can show the important value of the shift that may be achieved, e.g., in fibers. For a medium with following characteristics: L=0.1 m, dDn=$10^{-5}$ (near resonance, relatively slow and strong nonlinearity), d£t=$10^{-12}$ sec and a pulse with $l_0=10^{-6}$ m, $t_{pulse}=10^{-12}$ sec, $\Delta\Pi_{spectr}=10^{+12}$ sec$^{-1}$, we obtain $dw_{max} \approx 6.28 \times 10^{+12}$ sec$^{-1}$ (using $$dw_{max} \approx L\frac{w_0}{c}d\Delta n/d), dI_{max} \approx -\frac{l_0^2}{2pc}dw = -3.3*10^{-9}m$$

this is a very strong shift.

Figure 14:
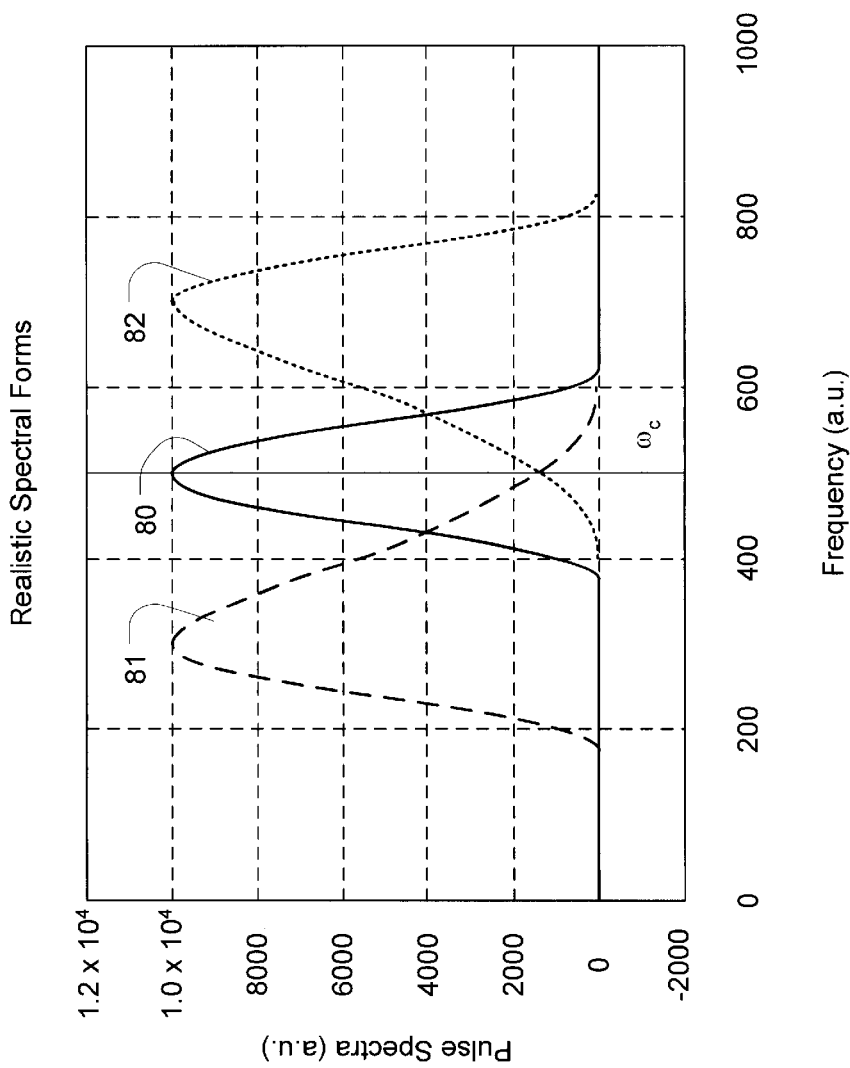
FIG. 14 is an illustration of the realistic spectral forms.

Let us assume, that the area 2 leads to down shift (curve 81, FIGS. 11 & 14) and the area 6 to up shift (curve 82, FIG. 14) of the pulse central frequency (curve 80, FIG. 14). If the temporal and material characteristics of areas 2 and 6 are properly chosen (values of nonlinearity and dispersion coefficients, etc.), then after traversing both areas, the frequency shifts would be almost compensated and the beam would emerge with the initial (input) spectrum. The installation of the Bragg grating between the areas 2 and 6 (as in FIG. 11) will then introduce the non-reciprocal operation that we need. Thus, let us suppose that the light is propagating from area 1 to area 7, and that the central frequency of the Bragg grating reflection is tuned on the center of the curve 1 (see FIG. 14). In this case, the light pulse spectrum (initially with a spectrum as the curve 80, FIG. 14) will be down shifted and transformed to the form of curve 81 (see FIG. 14) after traversing the area 2. The Bragg grating (area 4, FIG. 11), will then reflect it. Now, consider the case, when the same light is propagating from the area 7 to area 1. In this case, the light spectrum is up shifted after traversing the area 6 (curve 82, FIG. 14), and thus it will be completely transmitted through the Bragg grating (area 4, FIG. 11) since the last one is tuned to reflect the down shifted spectrum only (curve 81, FIG. 14). The initial light spectrum will be almost reconstructed when the light will further traverse the area 2 (see FIG. 11), which has opposed nonlinearity. We obtain thus a non reciprocal transmission. The main advantage of this system is its passive character—no external fields, sources or intervention are required.

Applications

There are many applications of optical isolators (diodes), but only a few preferred embodiments are described herein. First, the proposed technique will allow the direct fabrication of integrated OI in fibers and waveguides, that will be used for significant reduction of non desired reflections, reducing thus the noise level in communication systems, circulators, WDM circuits, etc.

The use of these OI in systems with laser sources will eliminate (as in the case of "classical" Faraday OI) the destabilization of laser operation that is present due to the re-injection of reflected light in the laser.

The non-reciprocity of these elements may be used for the creation of integrated laser double cavities possessing (each cavity) counter propagating traveling laser modes. This will allow the fabrication of integrated gyroscopes for applications in navigation systems (aviation, etc.).

The proposed optical diodes does not require costly polarizers and magnetic field sources, as the classical (Faraday) OI. The particular choice of used electro optic materials could allow us also to tune the resonant wavelength of our isolator, which would increase the flexibility of the device. The operation wavelength bandwidth of these isolators may be designed to be from very narrow to very large (depending upon the desired mode of operation) if we combine grating apodization (additional modulation) techniques. These elements may be created in industrial conditions using large family of optical elements, commercially available in the market. There are no restrictions on the size of the medium, so one can fabricate both guiding or bulk non-reciprocal elements. The possibility of fabrication of our isolators on already integrated circuits is a particular plus. Several techniques (implantation, lithography, deposition, holography) may be used which are actually very well mastered at industrial level and the corresponding fabricating machine (once created by engineers) may be used by non professional workers. The market of corresponding applications is very important (for example, the industry of communications, that represents a multibillion market) and is oriented on the new developing branches of Photonics based industry.

It will be understood that numerous modifications thereto will appear to those skilled in the art. Accordingly, the above description and accompanying drawings should be taken as illustrative of the invention and not in a limiting sense.

It will further be understood that it is intended to cover any variations, uses, or adaptations of the invention following, in general, the principles of the invention and including such departures form the present disclosure as come within known or customary practice within the art to which the invention pertains and as may be applied to the essential features hereinbefore set forth, and as follows in the scope of the appended claims.

What is claimed is:

1. A non-reciprocal optical element comprising:
   an optical medium coupled between a first port and a second port;
   a first Bragg grating recorded in the optical medium as a periodic variation of a respective first optical property of the optical medium; and
   a second Bragg grating recorded in the optical medium as a periodic variation of a respective second optical property of the optical medium, the second Bragg grating at least partially overlapping the first Bragg grating within the optical medium;
   whereby light of a predetermined wavelength traversing the optical medium from the first port toward the second port is substantially reflected, and light of the same wavelength traversing the optical medium from the second port toward the first port is substantially not reflected.

2. A non-reciprocal optical element as claimed in claim 1, wherein:
   the first Bragg grating is adapted to modulate an amplitude of light traversing the optical medium; and the second Bragg grating is adapted to modulate a phase of light traversing the optical medium.

3. A non-reciprocal optical element as claimed in claim 2, wherein:

the first Bragg grating comprises periodic variations in an absorption of the optical medium; and the second Bragg grating comprises periodic variations in a refractive index of the optical medium;

whereby the light is absorbed when passing from the second port to the first port.

4. A non-reciprocal optical element as claimed in claim 2, wherein:

the first Bragg grating comprises periodic variations in a gain of the optical medium; and the second Bragg grating comprises periodic variations in a refractive index of the optical medium;

whereby the light is amplified when passing from the second port to the first port.

5. A non-reciprocal optical element as claimed in claim 1, wherein fringes of the first Bragg grating are separated from corresponding fringes of the second Bragg grating by a predetermined fringe shift.

6. A non-reciprocal optical element as claimed in claim 5, wherein the predetermined fringe shift is less than one period.

7. A non-reciprocal optical element comprising:

an input port and an output port;

a pair of wavelength self-shifting optical elements optically coupled between the input and output ports, the wavelength self-shifting optical elements being adapted to cause respective substantially equal and opposite wavelength changes of light traversing each element; and a filtering element optically coupled between the frequency self-shifting optical elements, the filtering element being adapted to substantially reflect light of a selected wavelength, and substantially pass light of other wavelengths;

whereby light of a predetermined wavelength traveling in a forward direction between the input and output ports is shifted in wavelength away from the selected wavelength of the filtering element and thereby passes through the filtering element toward the output port, whereas light of the predetermined wavelength traveling in a reverse direction between the output port and the input port is shifted in wavelength to the selected wavelength of the filtering element and is thereby reflected back toward the output port.

8. A non-reciprocal optical element as claimed in claim 7, wherein said first and said second frequency self-shifting optical elements comprise nonlinear or strongly dispersive materials.

9. A non-reciprocal optical element as claimed in claim 7, wherein said filtering element is a Bragg grating.

* * * * *